United States Patent [19]

Takenawa

[11] Patent Number: 5,223,294

[45] Date of Patent: Jun. 29, 1993

[54] LIQUID DEFOAMING AGENT FOR FOOD AND METHOD OF USE THEREOF

[75] Inventor: Seishi Takenawa, Nara, Japan

[73] Assignee: Fujisawa Pharmaceutical Co., Ltd., Osaka, Japan

[21] Appl. No.: 959,538

[22] Filed: Oct. 13, 1992

Related U.S. Application Data

[63] Continuation of Ser. No. 680,535, Apr. 4, 1991, abandoned.

[30] Foreign Application Priority Data

| | | | |
|---|---|---|---|
| Apr. 5, 1990 | [JP] | Japan | 2-90993 |
| Jun. 13, 1990 | [JP] | Japan | 2-155915 |
| Jun. 29, 1990 | [JP] | Japan | 2-173799 |
| Sep. 11, 1990 | [JP] | Japan | 2-241551 |

[51] Int. Cl.$^5$ .............................. A23J 7/00
[52] U.S. Cl. ........................... 426/329; 252/321; 252/358; 426/330; 426/662
[58] Field of Search ............... 426/330, 329, 662; 252/321, 358

[56] References Cited

U.S. PATENT DOCUMENTS 4,609,490 9/1986 Itoh et al. ............................. 252/358

OTHER PUBLICATIONS

Patents Abstracts of Japan, vol. 6, No. 49 (C-96) (927) Mar. 31, 1982, & JP-A-56 164750 (Taiyou Kagaku Kogyo K.K.) Dec. 17, 1981.
Patent Abstracts of Japan, vol. 9, No. 222 (C-302) (1945) Sep. 9, 1985, & JP-A-60 83559 (Riken Vitamin Oil K.K.) May 11, 1985.
Patent Abstracts of Japan, vol. 4 No. 65 (C-10) (547) May 16, 1980, & JP-A-55 34051 (Kao Sekken K.K.) Mar. 10, 1980.
Patent Abstracts of Japan, vol. 11, No. 282 (C-446) (2729) Sep. 11, 1987, & JP-A-62 83009 (Fujisawa Pharmaceut. Co. Ltd.) Apr. 16, 1987.
Patent Abstracts of Japan, vol. 11, No. 96 (C-412) (2543) Mar. 26, 1987, & JP-A-61 247345 (T. Hasegawa Co. Ltd.) Nov. 4, 1986.
Data Base Wpil/Derwent AN-74-42306V [23] Derwent Publications Ltd. London GB & JP-A-48085490 [M. Saga] [Nov. 13, 1973].

*Primary Examiner*—Joseph Golian
*Attorney, Agent, or Firm*—Oblon, Spivak, McClelland, Maier & Neustadt

[57] ABSTRACT

The liquid defoaming agent for food of the present invention contains low fatty acid diglyceride as the essential component thereof and is made to contain lecithin and/or inorganic carrier, and the defoaming agent can exhibit excellent defoaming effect even at ambient temperature as well as during heating, in the process of producing various foodstuffs.

16 Claims, No Drawings

LIQUID DEFOAMING AGENT FOR FOOD AND METHOD OF USE THEREOF

This application is a continuation of application Ser. No. 07/680,535, filed on Apr. 4, 1991, now abandoned.

BACKGROUND OF THE INVENTION

1. Field of the Invention

The present invention relates to a liquid defoaming agent for food which is to be added in order to suppress foam generated during the process of producing bean curd and soybean milk, the process of producing processed milk products, the process of producing a processed tea product, and other processes of producing various foods. The present invention relates to a useful method for using a liquid defoaming agent for food.

2. Description of the Prior Art

In the process of producing or processing various foods, there are contained those generating foam, and the foam generation causes distinct deterioration of productivity and quality of products.

In the general process of producing bean curd having traditionally been carried out, for example, soy bean is immersed in water and finely milled into "go", which is then heated in an iron pot to remove bean-curd refuse. The foaming during the heating or the foaming of the soybean milk in the bean-curd refuse removed from the heated "go", induces various disadvantages e.g. boiling-liquid overflow from the iron pot.

In order to suppress such foaming, therefore, various types of defoaming agents have been developed.

Japanese Patent Publication No. 53137-87 discloses a defoaming agent for food comprising one type of low fatty acid diglyceride or a mixture of two types thereof. Japanese Patent Laid-open No. 83559/1985 discloses a defoaming agent for bean curd, with essential components thereof comprising polyrecinoleic acid esters, soybean phospholipid, salts such as calcium carbonate, calcium phosphate, etc., and fats and oils from animals and vegetables. Furthermore, Japanese Patent Laid-open No. 22914/1976 discloses a defoaming agent in which three components, i.e. oils from animals and vegetables, phospholipid, calcium carbonate compounds, are mixed.

In recent years, there has been developed and widely propagated a method comprising adding water into water-absorbing soybean for milling, filtering the milled soy bean at ambient temperature, separating soybean milk from bean-curd refuse to heat the soybean milk. Even in the method, foam is generated during the separation process or during the handling process after the separation, for example, during the transportation process through pipelines, causing a variety of disadvantages e.g. problems such as promotion of pump's wear and tear due to the intrusion of air bubble into pipes transporting soybean milk to an iron pot, and the overflow of bubble from a storage tank of soybean milk. Most of conventional defoaming agents have been developed for the principal subject to suppress foaming at the heating stage, and any foaming agent can exhibit such effect at a certain degree, as long as it may be soluble at high-temperature condition. However, in the modified process in which bean-curd refuse is separated at ambient temperature described hereinabove, conventional defoaming agents cannot sufficiently be dissolved, so that little defoaming effect may be expected therefrom. Thus, there has been desired a defoaming agent to exert excellent defoaming effect even under the condition at room temperature.

Such defoaming agent is required not only in the process of producing bean curd and soybean milk but also in terms of suppressing foaming during the various processes illustrated hereinbelow, and there has been desired a defoaming agent exhibiting excellent defoaming effect in various fields of food production;

(a) process of producing ice-mix powder employing cow's milk and sheep's milk, whole milk powder, skim-milk powder, modified milk powder, casein, etc; and process of producing the processed foods employing them, e.g. ice cream, ice milk, lactoice, ice candy, pudding, coffee whitener, yogurt drinks:

(b) process of processing coffee drinks, instant coffee and coffee powder; and process of producing the processed foods employing them:

(c) process of producing cacao beans, e.g. process of producing cocoa powder and cocoa drinks:

(d) process of producing green teas (middle-grade green tea, powdered tea), fermented teas (tea, uron tea, etc.): and process of producing processed foods employing their powder and extracted liquid.

(e) process of compounding binding agents (filling agents) during the production of ham and sausage:

(f) process of preparing bean paste using adzuki beans:

(g) process of producing boiled beans using soybean, kidney bean, horse bean, etc.:

(h) other processes of producing various foods (process of producing foodstuffs employing potatoes, process of producing Worcester sauce, process of producing jellies, etc.).

OBJECT OF THE INVENTION

The present invention has been achieved under such circumstances, and the object of the invention is to provide a liquid defoaming agent for food, capable of exhibiting excellent defoaming effect at room temperature as well as during heating in the process of producing various foods and the process of processing them. The other object of the present invention is to provide a useful method of using such liquid defoaming agent as described above.

SUMMARY OF THE INVENTION

The present invention with the objects having been achieved is a liquid defoaming agent summarized in the respect such that inorganic carrier is contained in addition to low fatty acid diglyceride and lecithin. The liquid defoaming agent described above is undoubtedly useful in suppressing the foam generated during the process of producing bean curd and soybean milk, and is also useful as the defoaming agent for other foodstuffs. Depending on the subjective foods (for example, individual foods from (a) to (h) hereinabove described), a two-component system comprising low fatty acid diglyceride and lecithin, or one comprising low fatty acid diglyceride and inorganic carrier, may also exhibit defoaming effect. When these defoaming agents are used, an appropriate amount of the agents may be added during an appropriate periodical point in the process of producing the individual foods described above (or prior to the blending process).

DETAILED DESCRIPTION OF THE INVENTION

The present inventors have investigated a defoaming agent capable of exhibiting excellent defoaming effect even at ambient temperature in the process of producing various foodstuffs. As a result, the inventors have found that a combination of three components, i.e. (A) low fatty acid diglyceride, (B) lecithin and (C) inorganic carrier, can exhibit excellent defoaming effect at ambient temperature, and they have achieved the invention.

The present invention is based on the combination of the three components from (A) to (C), but it has been found that the use of the two components, such as a combination of 1. low fatty acid diglycerides and lecithin and a combination of 2. low fatty acid diglyceride and inorganic carrier, is also effective on some kinds of foodstuffs. No component of three can exhibit defoaming effect when used singly, but it is surprising that the combination of low fatty acid diglyceride, lecithin and/or inorganic carrier exhibits the defoaming effect through the synergistic effect of the two or three components.

The defoaming agent of the present invention is provided in the liquid form by the combined use of the three components (or two components), and such liquid defoaming agent easily can be mixed with soybean milk and "go" at room temperature, and is therefore easy to be handled, thereby exerting excellent defoaming effect at ambient temperature. The defoaming agent of the present invention not only exhibits such effect at room temperature as described above, but also can be used at high temperature, so the agent exhibits superb defoaming effect, for example, in a traditional process where bean-curd refuse is separated after heating.

Low fatty acid diglyceride to be used in the present invention is in the liquid form, which is obtained by subjecting a low fatty acid having carbon atoms from 6 to 12, such as caproic acid, caprylic acid, lauric acid, lauric acid, etc. along with glycerin, to esterification, and the single type or two or more types of the low fatty acid diglyceride can be used in combination. Appropriately, the content of low fatty acid diglyceride in the defoaming agent of the present invention is approximately 5 to 96% by weight (in the case of using edible oils and additives described hereinbelow, the ratio expressed as a ratio to the entire amount of the defoaming agents including them; it is the same hereinafter.)

In accordance with the present invention, the use of such liquid components enables to form thorough suspension even in the case of using the inorganic carrier described hereinafter, which has contributed the achievement of the object of the present invention.

As the lecithin to be used in the present invention, there may be used synthesized lecithin besides natural lecithin such as soybean lecithin and egg-yolk lecithin. It is appropriate that the content of lecithin is about 2–70% by weight. The aforementioned lecithin of the present invention can be generally available in liquid, but the lecithin in solid may be also usable.

As the inorganic carrier to be used in the present invention, there may be illustrated calcium carbonate, calcium hydroxide, magnesium carbonate, tertiary calcium phosphate; they may be used singly or in combination. Of the inorganic carriers, the salt of alkaline earth metal carbonate is preferable; calcium carbonate and magnesium carbonate are more preferable. Appropriately, the content of such inorganic carrier is about 2 to 25% by weight.

The defoaming agent of the present invention can be used in combination with edible oils as a diluent, whereby the agent can be made into a defoaming agent excellent in handling. The edible oils to be used in the present invention may be adequately in liquid and edible, including for example vegetable oils such as soybean oil, soybean shirasimeyu, rape seed oil, coconut oil, palm oil, rice powder oil, etc., animal oils such as whale oil, sardine oil, etc.

For the purpose of viscosity adjustment, various additives may be contained in the defoaming agent of the present invention, other than the individual components. As such additives, fatty acid monoglyceride, sucrose fatty acid ester, polyglycerine fatty acid ester, hardened oil, etc. may be included. Of the additives illustrated, sucrose fatty acid ester is for lowering the viscosity and the others are for increasing the viscosity.

As is demonstrated in the gist described above, the defoaming agent of the present invention can be used suitably when the various individual foodstuffs from (a) to (h) are produced, with no limitation of the use thereof to the case of producing bean curd and soybean milk, and two components consisting of low fatty acid diglyceride and lecithin or inorganic carrier may generally be enough; but as the defoaming agent to be used in the process of producing bean curd and soybean milk, there may be used the one containing the three components described above.

There is no limitation concerning the time when the defoaming agent of the present invention is added, and the defoaming agent can be used at a time appropriately selected, such as those when food materials are dissolved or agitated or at the final stage as merchandise (for example at packaging). In the process of producing bean curd, for example, the time may be any stage of 1. adding water into water-absorbing soybean and milling the soybean at room temperature, 2. handling the milled "go" at ambient temperature to separate bean-curd refuse, 3. the stage of soybean milk after the separation of soybean milk from bean-curd refuse, or 4. the stage of heating "go". There is no limitation on the added ratio of the defoaming agent of the present invention, which is about 0.001 to 0.1% by weight.

When the defoaming agent of the present invention is used, the agent is appropriately dispersed even by employing an appropriate mixture of each of the components and the additives described above, but it is a preferable embodiment to use the defoaming agent formulated through addition of surfactants such as emulsifier or addition of emulsifying process, so as to be readily dispersible in water.

There is no limitation on the procedure for preparing the defoaming agent of the present invention, and the following procedure is just illustrated. Given amounts of a diluent such as soybean oil, etc. and caprylic acid diglyceride are dissolved and agitated at an appropriate temperature (for example at about 60° C.), to which is then added a viscosity adjuster such as glycerine fatty acid ester, sucrose fatty acid ester, etc. followed by subsequent mixing of lecithin, and then an inorganic carrier is added and mixed at an appropriate temperature (for example at about 55°), followed by cooling down to about 30° C. to prepare a product.

There are exemplified testing examples hereinbelow.

TEST EXAMPLE 1

Water (350 ml) was added to 200 g of water-absorbing soybeans, which were then milled with a mixer to separate soybean milk from bean-curd refuse. The soybean milk (300 ml) separated was placed in a 500-ml beaker, to which was simultaneously added each of the components shown in Table 1 as a defoaming agent (but No. 1 is the case without addition), which was then stirred with a handheld mixer for two minutes to foam the soybean milk. After left to stand for one minute, the height of the foam was measured to obtain the results as shown in Table 2.

TABLE 1

| Test No. | Defoaming agent | Added amount (%) |
|---|---|---|
| 1 | No addition | — |
| 2 | Caprylic acid diglyceride | 0.3 |
| 3 | Soybean lecithin (60% product) | 0.3 |
| 4 | Calcium carbonate | 0.3 |
| 5 | Caprylic acid diglyceride | 0.15 |
|   | Soybean lecithin (60% product) | 0.15 |
| 6 | Caprylic acid diglyceride | 0.15 |
|   | Calcium carbonate | 0.15 |
| 7 | Caprylic acid diglyceride | 0.15 |
|   | Soybean lecithin (60% product) | 0.075 |
|   | Calcium carbonate | 0.075 |
| 8 | Soybean lecithin (60% product) | 0.15 |
|   | Calcium carbonate | 0.15 |

TABLE 2

| Test No. | Foam height (mm) |
|---|---|
| 1 | 47 |
| 2 | 44 |
| 3 | 46 |
| 4 | 42 |
| 5 | 25 |
| 6 | 28 |
| 7 | 7 |
| 8 | 42 |

As shown clearly in Table 2, the defoaming agent satisfying the requirements of the present invention (Test No. 7) exhibits excellent defoaming effect even at low temperature. The lack of any essential component of the present invention cannot achieve the desired defoaming effect. In the defoaming agent of the present invention, similar defoaming effect was observed in the case of using magnesium carbonate or tertiary calcium phosphate instead of calcium carbonate.

TEST EXAMPLE 2

Water (25 l) was added to 12.5 kg of water-absorbing soybean, and each of the components shown in Table 3 was added to the milled product obtained by milling the soybean (but No. 9 is the case without addition), which was then steam-boiled in an iron pot to measure the height of foam in the iron pot. The height of the foam was measured to obtain the results as shown in Table 4.

TABLE 3

| Test No. | Defoaming agent | Added amount (%) |
|---|---|---|
| 9 | No addition | — |
| 10 | Caprylic acid diglyceride | 30 |
| 11 | Soybean lecithin (60% product) | 30 |
| 12 | Calcium carbonate | 30 |
| 13 | Caprylic acid diglyceride | 15 |
|   | Soybean lecithin (60% product) | 15 |
| 14 | Caprylic acid diglyceride | 15 |
|   | Calcium carbonate | 15 |
| 15 | Caprylic acid diglyceride | 15 |
|   | Soybean lecithin (60% product) | 7.5 |
|   | Calcium carbonate | 7.5 |
| 16 | Powdery defoaming agent commercially available [glycerin fatty acid ester containing C18 as the principal component (monoglyceride), lecithin and calcium carbonate] | 30 |

TABLE 4

| Test No. | Foam height (cm) |
|---|---|
| 9 | overflow from pot |
| 10 | same as above |
| 11 | same as above |
| 12 | same as above |
| 13 | 23 |
| 14 | overflow from pot |
| 15 | 9 |
| 16 | 11 |

As shown clearly in Table 4, the defoaming agent satisfying the requirements of the present invention (Test No. 15) exhibits more excellent defoaming effect even at high temperature, compared with the conventional products. In the defoaming agent of the present invention, similar defoaming effect was observed in the case of using magnesium carbonate or tertiary calcium phosphate instead of calcium carbonate.

TEST EXAMPLE 3

A 3% aqueous solution of sodium caseinate (300 ml) was placed in a 500-ml beaker, to which was simultaneously added each of the components shown in Table 5 as a defoaming agent (but No. 17 is the case without addition), which was then stirred with a handheld mixer for two minutes to foam the solution of sodium caseinate. The height of the foam was measured immediately after the stirring, to obtain the results as shown in Table 6.

TABLE 5

| Test No. | Defoaming agent | Added amount (%) |
|---|---|---|
| 17 | No addition | — |
| 18 | Silicone emulsion* (30% product) | 0.01 |
| 19 | Caprylic acid diglyceride | 0.01 |
| 20 | Calcium carbonate | 0.01 |
| 21 | Soybean lecithin (60% product) | 0.01 |
| 22 | Caprylic acid diglyceride | 0.009 |
|   | Calcium carbonate | 0.001 |
| 23 | Caprylic acid diglyceride | 0.009 |
|   | Soybean lecithin (60% product) | 0.001 |
| 24 | Caprylic acid diglyceride | 0.008 |
|   | Soybean lecithin (60% product) | 0.001 |
|   | Calcium carbonate | 0.001 |

*Silicone emulsion: "Silica pet" (product name) manufactured by Shin-etsu Chemical Industry, K.K.

TABLE 6

| Test No. | Foam height (mm) |
|---|---|
| 17 | 80 |
| 18 | 40 |
| 19 | 56 |
| 20 | 73 |
| 21 | 77 |
| 22 | 6 |
| 23 | 7 |
| 24 | 7 |

As shown clearly in Table 6, the defoaming agent satisfying the requirements of the present invention (Test No. 24) exhibits more excellent defoaming effect on the solution of sodium caseinate. It is also indicated that two components comprising lecithin or calcium carbonate added to caprylic acid diglyceride (Test Nos. 22 and 23) also have the defoaming effect. In the defoaming agents of Test Nos. 22 and 24, similar defoaming effect was observed in the case of using magnesium carbonate or tertiary calcium phosphate instead of calcium carbonate.

TEST EXAMPLE 4

Three-hundred milliliters of a 3% solution of the concentrated whey protein of cheese (WPC) was placed in a 500-ml beaker, to which was simultaneously added each of the components as a defoaming agent, shown in Table 7 hereinbelow (but No. 25 is the case without addition). The mixture was agitated with a handheld mixer for two minutes to foam the WPC solution. The height of the foam immediately after the agitation was measured to obtain the results shown in Table 8.

TABLE 7

| Test No. | Defoaming agent | Added amount (%) |
|---|---|---|
| 25 | No addition | — |
| 26 | Silicone emulsion* (30% product) | 0.01 |
| 27 | Caprylic acid diglyceride | 0.01 |
| 28 | Calcium carbonate | 0.01 |
| 29 | Soybean lecithin (60% product) | 0.01 |
| 30 | Caprylic acid diglyceride | 0.009 |
|    | Calcium carbonate | 0.001 |
| 31 | Caprylic acid diglyceride | 0.009 |
|    | Soybean lecithin (60% product) | 0.001 |
| 32 | Caprylic acid diglyceride | 0.008 |
|    | Soybean lecithin (60% product) | 0.001 |
|    | Calcium carbonate | 0.001 |

*Silicone emulsion: "Silica pet" (product name) manufactured by Shin-etsu Chemical Industry, K.K.

TABLE 8

| Test No. | Foam height (mm) |
|---|---|
| 25 | 40 |
| 26 | 3 |
| 27 | 15 |
| 28 | 40 |
| 29 | 38 |
| 30 | 3 |
| 31 | 2 |
| 32 | 3 |

As shown clearly in Table 8, the defoaming agent satisfying the requirements of the present invention (Test No. 32) exhibits more excellent defoaming effect on the WPC solution. It is also indicated that two components comprising lecithin or calcium carbonate added to caprylic acid diglyceride (Test Nos. 30 and 31) also have the defoaming effect. In the defoaming agents of Test Nos. 30 and 32, similar defoaming effect was observed in the case of using magnesium carbonate or tertiary calcium phosphate instead of calcium carbonate.

TEST EXAMPLE 5

Two hundred grams of coffee beans commercially available were milled and extracted into 3 l of hot water, and the resulting coffee extract in solution was cooled to room temperature. The solution of 300 ml was placed in a 500-ml beaker, to which was simultaneously added each of the components shown in Table 9 (but No. 33 is the case without addition) and agitated with a handheld mixer for two minutes to foam the coffee solution. The height of the foam immediately after the agitation was measured to obtain the results shown in Table 10.

TABLE 9

| Test No. | Defoaming agent | Added amount (%) |
|---|---|---|
| 33 | No addition | — |
| 34 | Silicone emulsion* (30% product) | 0.01 |
| 35 | Caprylic acid diglyceride | 0.01 |
| 36 | Calcium carbonate | 0.01 |
| 37 | Soybean lecithin (60% product) | 0.01 |
| 38 | Caprylic acid diglyceride | 0.009 |
|    | Calcium carbonate | 0.001 |
| 39 | Caprylic acid diglyceride | 0.009 |
|    | Soybean lecithin (60% product) | 0.001 |
| 40 | Caprylic acid diglyceride | 0.008 |
|    | Soybean lecithin (60% product) | 0.001 |
|    | Calcium carbonate | 0.001 |

*Silicone emulsion: "Silica pet" (product name) manufactured by Shin-etsu Chemical Industry, K.K.

TABLE 10

| Test No. | Foam height (mm) |
|---|---|
| 33 | 45 |
| 34 | 0 |
| 35 | 5 |
| 36 | 45 |
| 37 | 43 |
| 38 | 2 |
| 39 | 1 |
| 40 | 0 |

As shown clearly in Table 10, the defoaming agent satisfying the requirements of the present invention (Test No. 40) exhibits more excellent defoaming effect on the coffee extract in solution. It is also indicated that two components comprising lecithin or calcium carbonate added to caprylic acid diglyceride (Test Nos. 38 and 39) also have the defoaming effect. In the defoaming agents of Test Nos. 38 and 40, similar defoaming effect was observed in the case of using magnesium carbonate or tertiary calcium phosphate instead of calcium carbonate.

TEST EXAMPLE 6

Three hundred milliliters of a 10% solution of powdery egg white were placed in a 500-ml beaker, to which was simultaneously added each of the components shown in Table 11 (but No. 41 is the case without addition) and agitated with a handheld mixer for two minutes to foam the solution of powdery egg white. The height of the foam immediately after the agitation was measured to obtain the results shown in Table 12.

TABLE 11

| Test No. | Defoaming agent | Added amount (%) |
|---|---|---|
| 41 | No addition | — |
| 42 | Silicone emulsion* (30% product) | 0.05 |
| 43 | Caprylic acid diglyceride | 0.05 |
| 44 | Calcium carbonate | 0.05 |
| 45 | Soybean lecithin (60% product) | 0.05 |
| 46 | Caprylic acid diglyceride | 0.045 |
|    | Soybean lecithin (60% product) | 0.005 |
| 47 | Caprylic acid diglyceride | 0.040 |
|    | Soybean lecithin (60% product) | 0.005 |
|    | Calcium carbonate | 0.005 |

*Silicone emulsion: "Silica pet" (product name) manufactured by Shin-etsu Chemical Industry, K.K.

TABLE 12

| Test No. | Foam height (mm) |
|---|---|
| 41 | 60 |
| 42 | 42 |
| 43 | 51 |
| 44 | 60 |
| 45 | 54 |
| 46 | 32 |
| 47 | 15 |

As shown clearly in Table 12, the defoaming agent satisfying the requirements of the present invention (Test No. 47) exhibits more excellent defoaming effect on the solution of powdery egg white. It is also indicated that two components comprising caprylic acid diglyceride and soybean lecithin also have a slight degree of the defoaming effect. In the defoaming agent of Test No. 47, similar defoaming effect was observed in the case of using magnesium carbonate or tertiary calcium phosphate instead of calcium carbonate.

TEST EXAMPLE 7

Five hundred grams of adzuki beans after washing in water were placed in a pot along with 2.5 l of water and heated. On boiling, fire was weakened and heating was continued for two hours. After cooling to room temperature, the total weight of the adzuki beans and the boiled soup was adjusted to 4 kg by adding water. The solution (including adzuki beans) was milled with a house-hold mixer and the resulting solution (300 ml) was placed in a 500-ml beaker, to which was added each of the components shown in Table 13 (No. 48 is the case without addition) and stirred with a handheld mixer for two minutes to foam the solution. The height of the foam immediately after the agitation was measured to obtain the results shown in Table 14.

TABLE 13

| Test No. | Defoaming agent | Added amount (%) |
|---|---|---|
| 48 | No addition | — |
| 49 | Silicone emulsion* (30% product) | 0.01 |
| 50 | Caprylic acid diglyceride | 0.01 |
| 51 | Magnesium carbonate | 0.01 |
| 52 | Soybean lecithin (60% product) | 0.01 |
| 53 | Caprylic acid diglyceride | 0.009 |
|    | Magnesium carbonate | 0.001 |
| 54 | Caprylic acid diglyceride | 0.009 |
|    | Soybean lecithin (60% product) | 0.001 |
| 55 | Caprylic acid diglyceride | 0.008 |
|    | Soybean lecithin (60% product) | 0.001 |
|    | Magnesium carbonate | 0.001 |

*Silicone emulsion: "Silica pet" (product name) manufactured by Shin-etsu Chemical Industry, K.K.

TABLE 14

| Test No. | Foam height (mm) |
|---|---|
| 48 | 30 |
| 49 | 15 |
| 50 | 10 |
| 51 | 30 |
| 52 | 24 |
| 53 | 8 |
| 54 | 8 |
| 55 | 3 |

As shown clearly in Table 14, the defoaming agent satisfying the requirements of the present invention (Test No.55) exhibits more excellent defoaming effect on the boiled soup of adzuki beans. It is also indicated that two components (Test Nos.53 and 54) also have a slight degree of the defoaming effect. In the defoaming agents of Test Nos.53 and 55, similar defoaming effect was observed in the case of using calcium carbonate or tertiary calcium phosphate instead of magnesium carbonate.

TEST EXAMPLE 8

Three hundred milliliters of a 10% solution of skimmilk powder were placed in a 500-ml beaker, to which was simultaneously added each of the components shown in Table 15 (No.56 is the case without addition), and stirred with a handheld mixer for two minutes to foam the solution of skimmilk powder. The height of the foam immediately after the agitation was measured to obtain the results shown in Table 16.

TABLE 15

| Test No. | Defoaming agent | Added amount (%) |
|---|---|---|
| 56 | No addition | — |
| 57 | Silicone emulsion* (30% product) | 0.01 |
| 58 | Caprylic acid diglyceride | 0.01 |
| 59 | Calcium carbonate | 0.01 |
| 60 | Soybean lecithin (60% product) | 0.01 |
| 61 | Caprylic acid diglyceride | 0.009 |
|    | Calcium carbonate | 0.001 |
| 62 | Caprylic acid diglyceride | 0.009 |
|    | Soybean lecithin (60% product) | 0.001 |
| 63 | Caprylic acid diglyceride | 0.008 |
|    | Soybean lecithin (60% product) | 0.001 |
|    | Calcium carbonate | 0.001 |

*Silicone emulsion: "Silica pet" (product name) manufactured by Shin-etsu Chemical Industry, K.K.

TABLE 16

| Test No. | Foam height (mm) |
|---|---|
| 56 | 48 |
| 57 | 38 |
| 58 | 45 |
| 59 | 50 |
| 60 | 53 |
| 61 | 28 |
| 62 | 3 |
| 63 | 4 |

As shown clearly in Table 16, the defoaming agent satisfying the requirements of the present invention (Test No.63) exhibits more excellent defoaming effect on the solution of skimmilk powder. It is also indicated that two components (Test Nos. 61 and 62) also have a slight degree of the defoaming effect. In the defoaming agents of Test Nos. 61 and 63, similar defoaming effect was observed in the case of using magnesium carbonate or tertiary calcium phosphate instead of calcium carbonate.

TEST EXAMPLE 9

Three hundred ml of a 3% solution of powdered tea were placed in a 500-ml beaker, to which was simultaneously added each of the components shown in Table 17 (No.64 is the case without addition), and stirred with a handheld mixer for two minutes to foam the solution of the powdered tea. The height of the foam immediately after the agitation was measured to obtain the results shown in Table 18.

TABLE 17

| Test No. | Defoaming agent | Added amount (%) |
|---|---|---|
| 64 | No addition | — |
| 65 | Silicone emulsion* (30% product) | 0.01 |
| 66 | Caprylic acid diglyceride | 0.01 |
| 67 | Calcium carbonate | 0.01 |
| 68 | Soybean lecithin (60% product) | 0.01 |

TABLE 17-continued

| Test No. | Defoaming agent | Added amount (%) |
|---|---|---|
| 69 | Caprylic acid diglyceride | 0.009 |
|  | Calcium carbonate | 0.001 |
| 70 | Caprylic acid diglyceride | 0.009 |
|  | Soybean lecithin (60% product) | 0.001 |
| 71 | Caprylic acid diglyceride | 0.008 |
|  | Soybean lecithin (60% product) | 0.001 |
|  | Calcium carbonate | 0.001 |

*Silicone emulsion: "Silica pet" (product name) manufactured by Shin-etsu Chemical Industry, K.K.

TABLE 18

| Test No. | Foam height (mm) |
|---|---|
| 64 | 50 |
| 65 | 8 |
| 66 | 15 |
| 67 | 48 |
| 68 | 32 |
| 69 | 10 |
| 70 | 7 |
| 71 | 7 |

As shown clearly in Table 18, the defoaming agent satisfying the requirements of the present invention (Test No.71) exhibits more excellent defoaming effect on the solution of powdered tea. It is also indicated that two components (Test Nos.69 and 70) also have a slight degree of the defoaming effect. In the defoaming agents of Test Nos. 69 and 71, similar defoaming effect was observed in the case of using magnesium carbonate or tertiary calcium phosphate instead of calcium carbonate.

TEST EXAMPLE 10

Three hundred milliliters of a solution of Worcester sauce were placed in a 500-ml beaker, to which was simultaneously added each of the components shown in Table 19 (No.72 is the case without addition), and stirred with a handheld mixer for two minutes to foam the solution of Worcester sauce. The height of the foam immediately after the agitation was measured to obtain the results shown in Table 20.

TABLE 19

| Test No. | Defoaming agent | Added amount (%) |
|---|---|---|
| 72 | No addition | — |
| 73 | Silicone emulsion* (30% product) | 0.01 |
| 74 | Caprylic acid diglyceride | 0.01 |
| 75 | Calcium carbonate | 0.01 |
| 76 | Soybean lecithin (60% product) | 0.01 |
| 77 | Caprylic acid diglyceride | 0.009 |
|  | Calcium carbonate | 0.001 |
| 78 | Caprylic acid diglyceride | 0.009 |
|  | Soybean lecithin (60% product) | 0.001 |
| 79 | Caprylic acid diglyceride | 0.008 |
|  | Soybean lecithin (60% product) | 0.001 |
|  | Calcium carbonate | 0.001 |

*Silicone emulsion: "Silica pet" (product name) manufactured by Shin-etsu Chemical Industry, K.K.

TABLE 20

| Test No. | Foam height (mm) |
|---|---|
| 72 | 42 |
| 73 | 0 |
| 74 | 20 |
| 75 | 40 |
| 76 | 5 |
| 77 | 0 |
| 78 | 0 |

TABLE 20-continued

| Test No. | Foam height (mm) |
|---|---|
| 79 | 0 |

As shown clearly in Table 20, the defoaming agent satisfying the requirements of the present invention (Test No.79) exhibits more excellent defoaming effect on the solution of Worcester sauce. It is also indicated that two components where either one of lecithin and calcium carbonate is added to caprylic acid diglyceride (Test Nos.77 and 78) also have the defoaming effect on the foaming of the solution of Worcester sauce. In the defoaming agents (Test Nos. 77 and 79), similar defoaming effect was observed in the case of using magnesium carbonate or tertiary calcium phosphate instead of calcium carbonate.

TEST EXAMPLE 11

Six-hundred and sixty grams of potato (species, Danshaku) were minced, to which was added 5.5 l of water and ground with a mixer. The resulting solution of 300 ml was placed in a 500-ml beaker, to which was added each of the components shown in Table 21 (but No.80 is the case without addition) and stirred with a handheld mixer for two minutes to foam the solution. The height of the foam immediately after the agitation was measured to obtain the results shown in Table 22.

TABLE 21

| Test No. | Defoaming agent | Added amount (%) |
|---|---|---|
| 80 | No addition | — |
| 81 | Silicone emulsion* (30% product) | 0.01 |
| 82 | Caprylic acid diglyceride | 0.01 |
| 83 | Calcium carbonate | 0.01 |
| 84 | Soybean lecithin (60% product) | 0.01 |
| 85 | Caprylic acid diglyceride | 0.009 |
|  | Calcium carbonate | 0.001 |
| 86 | Caprylic acid diglyceride | 0.009 |
|  | Soybean lecithin (60% product) | 0.001 |
| 87 | Caprylic acid diglyceride | 0.008 |
|  | Soybean lecithin (60% product) | 0.001 |
|  | Calcium carbonate | 0.001 |

*Silicone emulsion: "Silica pet" (product name) manufactured by Shin-etsu Chemical Industry, K.K.

TABLE 22

| Test No. | Foam height (mm) |
|---|---|
| 80 | 53 |
| 81 | 24 |
| 82 | 40 |
| 83 | 46 |
| 84 | 43 |
| 85 | 11 |
| 86 | 7 |
| 87 | 5 |

As shown clearly in Table 22, the defoaming agent satisfying the requirements of the present invention (Test No. 87) exhibits more excellent defoaming effect on the solution of minced potato. It is also indicated that two components where either one of lecithin or calcium carbonate is added to caprylic acid diglyceride (Test Nos. 85 and 86) also have the defoaming effect. In the defoaming agents Test Nos. 85 and 87, similar defoaming effect was observed in the case of using magnesium carbonate or tertiary calcium phosphate instead of calcium carbonate.

TEST EXAMPLE 12

The tea extract solution, extracted by adding 3 l of hot water to 75 g of tea commercially available, was cooled to room temperature. The solution (300 ml) was placed in a 500-ml beaker, to which was added each of the components shown in Table 23 as a defoaming agent (but No. 88 is the case without addition), stirred with a handheld mixer for two minutes to foam the tea solution. The height of the foam immediately after the agitation was measured to obtain the results shown in Table 24.

TABLE 23

| Test No. | Defoaming agent | Added amount (%) |
| --- | --- | --- |
| 88 | No addition | — |
| 89 | Silicone emulsion* (30% product) | 0.01 |
| 90 | Caprylic acid diglyceride | 0.01 |
| 91 | Calcium carbonate | 0.01 |
| 92 | Soybean lecithin (60% product) | 0.01 |
| 93 | Caprylic acid diglyceride | 0.009 |
|  | Calcium carbonate | 0.001 |
| 94 | Caprylic acid diglyceride | 0.009 |
|  | Soybean lecithin (60% product) | 0.001 |
| 95 | Caprylic acid diglyceride | 0.008 |
|  | Soybean lecithin (60% product) | 0.001 |
|  | Calcium carbonate | 0.001 |

*Silicone emulsion: "Silica pet" (product name) manufactured by Shin-etsu Chemical Industry, K.K.

TABLE 24

| Test No. | Foam height (mm) |
| --- | --- |
| 88 | 42 |
| 89 | 2 |
| 90 | 11 |
| 91 | 42 |
| 92 | 8 |
| 93 | 0 |
| 94 | 0 |
| 95 | 0 |

As shown clearly in Table 24, the defoaming agent satisfying the requirements of the present invention (Test No. 95) exhibits more excellent defoaming effect on the tea extract solution. Two components (Test Nos. 93 and 94) were observed to also have the defoaming effect. In the defoaming agents of Test Nos. 93 and 95, similar defoaming effect was observed in the case of using magnesium carbonate or tertiary calcium phosphate instead of calcium carbonate.

TEST EXAMPLE 13

The uron tea extract solution, extracted by adding 3.25 l of hot water to 75 g of uron tea commercially available, was cooled to room temperature. The solution (300 ml) was placed in a 500-ml beaker, to which was added each of the components shown in Table 25 as a defoaming agent (but No. 96 is the case without addition), stirred with a handheld mixer for two minutes to foam the uron-tea extract solution. The height of the foam immediately after the agitation was measured to obtain the results shown in Table 26.

TABLE 25

| Test No. | Defoaming agent | Added amount (%) |
| --- | --- | --- |
| 96 | No addition | — |
| 97 | Silicone emulsion* (30% product) | 0.01 |
| 98 | Caprylic acid diglyceride | 0.01 |
| 99 | Calcium carbonate | 0.01 |
| 100 | Soybean lecithin (60% product) | 0.01 |
| 101 | Caprylic acid diglyceride | 0.009 |
|  | Calcium carbonate | 0.001 |
| 102 | Caprylic acid diglyceride | 0.009 |
|  | Soybean lecithin (60% product) | 0.009 |
| 103 | Caprylic acid diglyceride | 0.008 |
|  | Soybean lecithin (60% product) | 0.001 |
|  | Calcium carbonate | 0.001 |

*Silicone emulsion: "Silica pet" (product name) manufactured by Shin-etsu Chemical Industry, K.K.

TABLE 26

| Test No. | Foam height (mm) |
| --- | --- |
| 96 | 43 |
| 97 | 2 |
| 98 | 28 |
| 99 | 48 |
| 100 | 10 |
| 101 | 5 |
| 102 | 3 |
| 103 | 0 |

As shown clearly in Table 26, the defoaming agent satisfying the requirements of the present invention (Test No. 103) exhibits more excellent defoaming effect on the uron-tea extract solution. Two components (Test Nos. 101 and 102) were observed to also have the defoaming effect. In the defoaming agents of Test Nos. 101 and 103, similar defoaming effect was observed in the case of using magnesium carbonate or tertiary calcium phosphate instead of calcium carbonate.

TEST EXAMPLE 14

Three-hundred milliliters of a 10% solution of a pudding powder commercially available [manufactured by House Food Industry, k.K., "Pudding Mix"] were placed in a 500-ml beaker, to which was simultaneously added each of the components shown in Table 27 as a defoaming agent (but No. 104 is the case without addition) stirred with a handheld mixer for two minutes to foam the tea solution. The height of the foam immediately after the agitation was measured to obtain the results shown in Table 28.

TABLE 27

| Test No. | Defoaming agent | Added amount (%) |
| --- | --- | --- |
| 104 | No addition | — |
| 105 | Silicone emulsion* (30% product) | 0.01 |
| 106 | Caprylic acid diglyceride | 0.01 |
| 107 | Calcium carbonate | 0.01 |
| 108 | Soybean lecithin (60% product) | 0.01 |
| 109 | Caprylic acid diglyceride | 0.009 |
|  | Calcium carbonate | 0.001 |
| 110 | Caprylic acid diglyceride | 0.009 |
|  | Soybean lecithin (60% product) | 0.001 |
| 111 | Caprylic acid diglyceride | 0.008 |
|  | Soybean lecithin (60% product) | 0.001 |
|  | Calcium carbonate | 0.001 |

*Silicone emulsion: "Silica pet" (product name) manufactured by Shin-etsu Chemical Industry, K.K.

TABLE 28

| Test No. | Foam height (mm) |
| --- | --- |
| 104 | 47 |
| 105 | 3 |
| 106 | 7 |
| 107 | 59 |
| 108 | 57 |
| 109 | 3 |
| 110 | 0 |
| 111 | 0 |

As shown clearly in Table 28, the defoaming agent satisfying the requirements of the present invention (Test No. 111) exhibits more excellent defoaming effect on the pudding solution. Two components (Test Nos. 109 and 110) were observed to also have the defoaming effect. In the defoaming agents of Test Nos. 109 and 111, similar defoaming effect was observed in the case of using magnesium carbonate or tertiary calcium phosphate instead of calcium carbonate.

TEST EXAMPLE 15

Three-hundred milliliters of a 10% solution of a jelly powder commercially available [manufactured by House Food Industry, k.K., "Jellyace (melon)"] were placed in a 500-ml beaker, to which was simultaneously added each of the components shown in Table 29 as a defoaming agent (but No. 112 is the case without addition), stirred with a handheld mixer for two minutes to foam the tea solution. The height of the foam immediately after the agitation was measured to obtain the results shown in Table 30.

TABLE 29

| Test No. | Defoaming agent | Added amount (%) |
|---|---|---|
| 112 | No addition | — |
| 113 | Silicone emulsion* (30% product) | 0.01 |
| 114 | Caprylic acid diglyceride | 0.01 |
| 115 | Calcium carbonate | 0.01 |
| 116 | Soybean lecithin (60% product) | 0.01 |
| 117 | Caprylic acid diglyceride | 0.009 |
|  | Calcium carbonate | 0.001 |
| 118 | Caprylic acid diglyceride | 0.009 |
|  | Soybean lecithin (60% product) | 0.001 |
| 119 | Caprylic acid diglyceride | 0.008 |
|  | Soybean lecithin (60% product) | 0.001 |
|  | Calcium carbonate | 0.001 |

*Silicone emulsion: "Silica pet" (product name) manufactured by Shin-etsu Chemical Industry, K.K.

TABLE 30

| Test No. | Foam height (mm) |
|---|---|
| 112 | 54 |
| 113 | 3 |
| 114 | 46 |
| 115 | 55 |
| 116 | 42 |
| 117 | 32 |
| 118 | 3 |
| 119 | 2 |

As shown clearly in Table 30, the defoaming agent satisfying the requirements of the present invention (Test No. 119) exhibits more excellent defoaming effect on the jelly solution. Two components of caprylic acid diglyceride and soybean lecithin (Test No. 118) were observed to also have the defoaming effect. In the defoaming agent of Test No. 119, similar defoaming effect was observed in the case of using magnesium carbonate or tertiary calcium phosphate instead of calcium carbonate.

TEST EXAMPLE 16

The solution (300 ml), obtained by adding skimmilk power to a 0.3% solution of locust bean gum to a final concentration of 3%, was placed in a 500-ml beaker, to which was simultaneously added each of the components in Table 31 (but No. 120 is the case without addition) and stirred with a handheld mixer to foam the solution. The height of the foam immediately after the agitation was measured to obtain the results shown in Table 32.

TABLE 31

| Test No. | Defoaming agent | Added amount (%) |
|---|---|---|
| 120 | No addition | — |
| 121 | Silicone emulsion* (30% product) | 0.05 |
| 122 | Caprylic acid diglyceride | 0.05 |
| 123 | Calcium carbonate | 0.05 |
| 124 | Soybean lecithin (60% product) | 0.05 |
| 125 | Caprylic acid diglyceride | 0.045 |
|  | Calcium carbonate | 0.005 |
| 126 | Caprylic acid diglyceride | 0.045 |
|  | Soybean lecithin (60% product) | 0.005 |
| 127 | Caprylic acid diglyceride | 0.040 |
|  | Soybean lecithin (60% product) | 0.005 |
|  | Calcium carbonate | 0.005 |

*Silicone emulsion: "Silica pet" (product name) manufactured by Shin-etsu Chemical Industry, K.K.

TABLE 32

| Test No. | Foam height (mm) |
|---|---|
| 120 | 69 |
| 121 | 0 |
| 122 | 25 |
| 123 | 73 |
| 124 | 72 |
| 125 | 6 |
| 126 | 0 |
| 127 | 0 |

As shown clearly in Table 32, the defoaming agent satisfying the requirements of the present invention (Test No. 127) exhibits more excellent defoaming effect on the mixed solution of locust bean gum and skimmilk powder. Two components (Test Nos. 125 and 126) were observed to also have the defoaming effect. In the defoaming agents of Test Nos. 125 and 127, similar defoaming effect was observed in the case of using magnesium carbonate or tertiary calcium phosphate instead of calcium carbonate.

TEST EXAMPLE 17

A 10% solution (300 ml) of skimmilk powder was placed in a 500-ml beaker, to which was simultaneously added each of the components in Table 33 (but No. 128 is the case without addition) and stirred with a handheld mixer to foam the solution of skimmilk powder. The height of the foam immediately after the agitation was measured to obtain the results shown in Table 34.

TABLE 33

| Test No. | Defoaming agent | Added amount (%) |
|---|---|---|
| 128 | No addition | — |
| 129 | Silicone emulsion* (30% product) | 0.01 |
| 130 | Caprylic acid diglyceride | 0.01 |
| 131 | Magnesium carbonate | 0.01 |
| 132 | Soybean lecithin (60% product) | 0.01 |
| 133 | Caprylic acid diglyceride | 0.009 |
|  | Magnesium carbonate | 0.001 |
| 134 | Caprylic acid diglyceride | 0.009 |
|  | Soybean lecithin (60% product) | 0.001 |
| 135 | Caprylic acid diglyceride | 0.008 |
|  | Soybean lecithin (60% product) | 0.001 |
|  | Magnesium carbonate | 0.001 |

*Silicone emulsion: "Silica pet" (product name) manufactured by Shin-etsu Chemical Industry, K.K.

TABLE 34

| Test No. | Foam height (mm) |
|---|---|
| 128 | 46 |
| 129 | 38 |

TABLE 34-continued

| Test No. | Foam height (mm) |
| --- | --- |
| 130 | 42 |
| 131 | 52 |
| 132 | 52 |
| 133 | 30 |
| 134 | 3 |
| 135 | 0 |

As shown clearly in Table 34, the defoaming agent satisfying the requirements of the present invention (Test No. 135) exhibits more excellent defoaming effect on the solution of skimmilk powder. Two components (Test Nos. 133 and 134) were observed to also have the defoaming effect.

TEST EXAMPLE 18

A 10% solution (300 ml) of skimmilk powder was placed in a 500-ml beaker, to which was simultaneously added each of the components in Table 35 (but No. 136 is the case without addition) and stirred with a handheld mixer to foam the solution of skimmilk powder. The height of the foam immediately after the agitation was measured to obtain the results shown in Table 36.

TABLE 35

| Test No. | Defoaming agent | Added amount (%) |
| --- | --- | --- |
| 136 | No addition | — |
| 137 | Silicone emulsion* (30% product) | 0.01 |
| 138 | Caprylic acid diglyceride | 0.01 |
| 139 | Tertiary calcium phosphate | 0.01 |
| 140 | Soybean lecithin (60% product) | 0.01 |
| 141 | Caprylic acid diglyceride | 0.009 |
|  | Tertiary calcium phosphate | 0.001 |
| 142 | Caprylic acid diglyceride | 0.009 |
|  | Soybean lecithin (60% product) | 0.001 |
| 143 | Caprylic acid diglyceride | 0.008 |
|  | Soybean lecithin (60% product) | 0.001 |
|  | Tertiary calcium phosphate | 0.001 |

*Silicone emulsion: "Silica pet" (product name) manufactured by Shin-etsu Chemical Industry, K.K.

TABLE 36

| Test No. | Foam height (mm) |
| --- | --- |
| 136 | 52 |
| 137 | 35 |
| 138 | 45 |
| 139 | 54 |
| 140 | 54 |
| 141 | 29 |
| 142 | 4 |
| 143 | 5 |

As shown clearly in Table 36, the defoaming agent satisfying the requirements of the present invention (Test No. 143) exhibits more excellent defoaming effect on the solution of skimmilk powder. Two components (Test No. 141 and 143) were observed to also have the defoaming effect.

There will now be shown embodiments.

EXAMPLES

EXAMPLE 1

To a mixed solution comprising 1 kg of caprylic acid diglyceride (Sunfat GDC-S, manufactured by Taiyo Chemical K.K.), 2 kg of soybean lecithin (manufactured by Ajinomoto K.K.) and 6 kg of soybean shirashimeyu was added 1 kg of calcium carbonate to obtain 10 kg of a liquid defoaming agent.

EXAMPLE 2

To a mixed solution comprising 1.5 kg of caprylic acid diglyceride (Sunfat GDC-S, manufactured by Taiyo Chemical K.K.), 2 kg of soybean lecithin (manufactured by Ajinomoto K.K.) and 6 kg of soybean shirashimeyu was added 0.5 kg of calcium carbonate to obtain 10 kg of a liquid defoaming agent.

EXAMPLE 3

To a mixed solution comprising 1 kg of caprylic acid diglyceride (Sunfat GDC-S, manufactured by Taiyo Chemical K.K.), 2 kg of soybean lecithin (manufactured by Ajinomoto K.K.) and 6 kg of soybean shirashimeyu was added 0.5 kg of glycerin fatty acid ester (Sunsoft No. 8000, manufactured by Taiyo Chemical K.K.), which was melted and dissolved, followed by addition of 1 kg of calcium carbonate to obtain 10 kg of a liquid defoaming agent.

EXAMPLE 4

To a mixed solution comprising 7.6 kg of caprylic acid diglyceride (Sunfat GDC-S) and 1 kg of soybean lecithin (manufactured by Ajinomoto K.K.) was added 0.4 kg of glycerin fatty acid ester (Sunsoft No. 2500), which was melted and dissolved, followed by addition of 1 kg of calcium carbonate, to obtain 10 kg of a liquid defoaming agent.

EXAMPLE 5

To a mixed solution comprising 1 kg of caprylic acid diglyceride (Sunfat GDC-S), 1.5 kg of soybean lecithin (manufactured by Ajinomoto K.K.) and 6.5 kg of soybean shirashimeyu was added 0.5 kg of glycerin fatty acid ester (Sunsoft No. 2500), which was melted and dissolved, followed by addition of 0.5 kg of magnesium carbonate, to obtain 10 kg of a liquid defoaming agent.

EXAMPLE 6

To a mixed solution comprising 6.5 kg of caprylic acid diglyceride (Sunfat GDC-S), 1.5 kg of soybean lecithin (manufactured by Ajinomoto K.K.) and 1 kg of soybean shirashimeyu was added 0.5 kg of glycerin fatty acid ester (Sunsoft No. 2500), which was melted and dissolved, followed by addition of 0.5 kg of magnesium carbonate, to obtain 10 kg of a liquid defoaming agent.

EXAMPLE 7

To 9 kg of caprylic acid diglyceride (Sunfat GDC-S) was added 1 kg of soybean lecithin (manufactured by Ajinomoto K.K.) to obtain 10 kg of a liquid defoaming agent.

EXAMPLE 8

To 8.5 kg of caprylic acid diglyceride (Sunfat GDC-S) was added 0.5 kg of soybean lecithin (manufactured by Ajinomoto K.K.), which was then melted and dissolved, followed by addition of 1 kg of magnesium carbonate to obtain 10 kg of a liquid defoaming agent.

EXAMPLE 9

To 1 kg of caprylic acid diglyceride (Sunfat GDC-S) and 7.5 kg of soybean shirashimeyu was added 0.5 kg of glycerin fatty acid ester (Sunsoft No. 2500), which was then melted and dissolved, followed by addition of 0.5 kg of magnesium carbonate to obtain 10 kg of a liquid defoaming agent.

What is claimed is:

1. A liquid defoaming agent for food consisting essentially of 2 to 70% by weight of lecithin, 2 to 25% by weight of an inorganic carrier selected from the group consisting of calcium hydroxide, tertiary calcium phosphate and an alkaline earth metal carbonate and 5–96% by weight of at least one low fatty acid diglyceride.

2. The liquid defoaming agent for food according to claim 1, wherein the low fatty acid diglyceride is in the liquid form, obtained by esterifying a low fatty acid having 6 to 12 carbon atoms with glycerin.

3. The liquid defoaming agent for food according to claim 2, wherein the low fatty acid diglyceride is caprylic acid diglyceride.

4. The liquid defoaming agent for food according to any one of claims 1 to 3, wherein the inorganic carrier is calcium carbonate, magnesium carbonate or tertiary calcium phosphate.

5. The liquid defoaming agent for food according to claim 1, containing caprylic acid diglyceride, lecithin and magnesium carbonate.

6. A liquid defoaming agent for food consisting essentially of 2–70% by weight of lecithin, 2–25% by weight of an inorganic carrier selected from the group consisting of calcium hydroxide, tertiary calcium phosphate and an alkaline earth metal carbonate, 5–96% by weight of at least one low fatty acid diglyceride and at least one selected from the group consisting of diluent, viscosity adjuster and emulsifier.

7. The liquid defoaming agent for food according to claim 6, wherein the diluent is edible oil.

8. The liquid defoaming agent according to claim 7, containing caprylic acid diglyceride, lecithin, magnesium carbonate and edible oil.

9. A method of defoaming or suppressing the foaming of food, comprising adding the liquid defoaming agent of claim 1 or claim 6 during a process of producing ice-mix powder, whole milk powder, skim milk powder, modified milk powder, or casein, or during a process of producing processed foods incorporating ice-mix powder, whole milk powder, skim milk powder, modified milk powder, or casein.

10. A method of defoaming or suppressing the foaming of food, comprising adding the liquid defoaming agent of claim 1 or claim 6 during a process of producing coffee drinks, instant coffee, or coffee powder, or during a process of producing the processed foods incorporating coffee drinks, instant coffee, or coffee powder.

11. A method of defoaming or suppressing the foaming of food comprising adding the liquid defoaming agent of claim 1 or claim 6 during the processing of cacao beans.

12. A method of defoaming or suppressing the foaming of food comprising adding the liquid defoaming agent of claim 1 or claim 6 during a process of producing green tea or fermented tea, or during a process of producing the processed foods incorporating a powder and/or extract solution of green tea or fermented tea.

13. A method of defoaming or suppressing the foaming of food comprising adding the liquid defoaming agent of claim 1 or claim 6 during a process of producing ham and sausage prior to blending any binding agent.

14. A method for defoaming or suppressing the foaming of food comprising adding the liquid defoaming agent of claim 1 or claim 6 during a process of preparing bean paste.

15. A method of defoaming or suppressing the foaming of food comprising adding the liquid defoaming agent of claim 1 or claim 6 during the preparation of boiled beans.

16. A method of defoaming or suppressing the foaming of food comprising adding the liquid defoaming agent of claim 1 or claim 6 during a process of producing bean curd or soybean milk.

* * * * *